2 Sheets--Sheet 1.

GEORGE E. WARING, Jr.

Deoderizing Water Closets.

No. 4,804. Reissued March 12, 1872.

*Witnesses:*
*E. Wolff.*
*J. Felbel.*

*Inventor.*
*George E. Waring.*
*By atty*
*J. Mac Intire*

AM. PHOTO-LITHOGRAPHIC CO. N.Y. (OSBORNE'S PROCESS.)

2 Sheets--Sheet 2.

GEORGE E. WARING, Jr.

Deoderizing Water Closets.

No. 4,804.

Reissued March 12, 1872.

*Witnesses:*
E. Wolff
J. Felbel

*Inventor:*
George E. Waring.
By Atty. J. Mar. Entire.

AM. PHOTO-LITHOGRAPHIC CO. N.Y. (OSBORNE'S PROCESS.)

UNITED STATES PATENT OFFICE.

GEORGE E. WARING, JR., OF NEWPORT, RHODE ISLAND, ASSIGNOR TO THE EARTH-CLOSET COMPANY, OF HARTFORD, CONNECTICUT.

IMPROVEMENT IN DEODORIZING WATER-CLOSETS.

Specification forming part of Letters Patent No. 90,709, dated June 1, 1869; reissue No. 4,804, dated March 12, 1872.

DIVISION B.

*To all whom it may concern:*

Be it known that I, GEORGE E. WARING, Jr., of Newport, in the county of Newport and State of Rhode Island, have invented certain new and useful Improvements in Earth-Closets; and I do hereby declare that the following is a full, clear, and exact description thereof, whereby a person skilled in the art can make and use the same, reference being had to the accompanying drawing and to the letters of reference marked thereon.

My invention relates to that kind of earth-closets in which a hopper or receptacle is provided to contain a supply of the powdered earth or other deodorant, and in which there is a suitable mechanism, by means of which (either through the use of automatic means or by the occupant of the seat) the excrement deposited may be deodorized by a charge of earth each time the closet is used.

Figure 1:
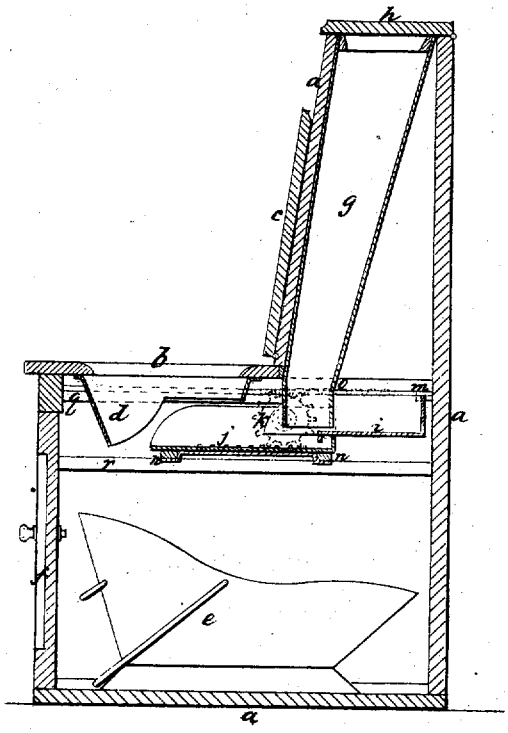
Figure 2:
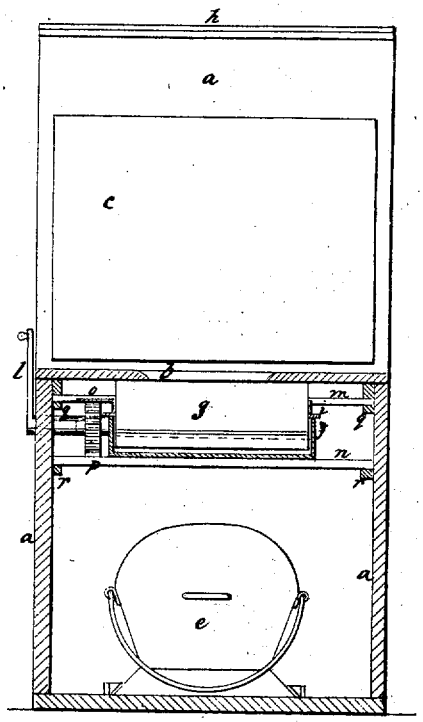
Figure 3:
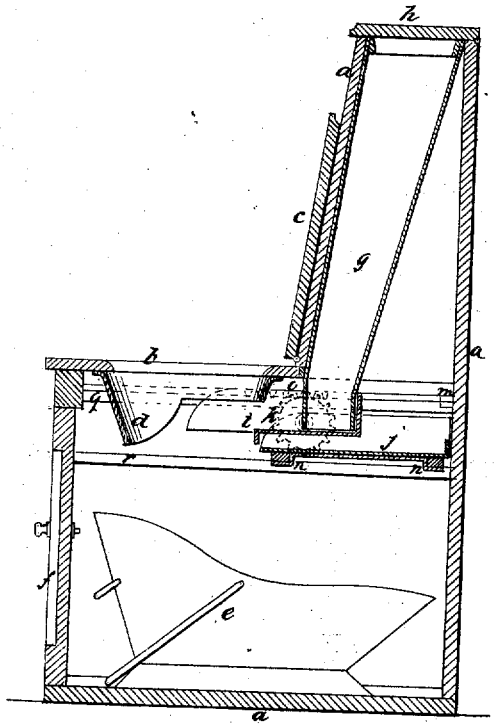

In the accompanying drawing, Figures 1, 2, and 3 are sectional views of an earth-closet embracing my invention, and also features which constitute the subjects of claims in another application filed simultaneously with this.

Although much of the following description, applying to the closet illustrated at Figs. 1, 2, and 3, may appear to relate to parts made the subject of claims in my other application, I intend the following explanations to refer particularly and wholly to the commode made as claimed in this application.

*a* is the box or case inclosing the whole apparatus. *b* is the seat; *c*, the seat-cover; *d*, a deflector or urine-guide; and *e* is the usual pan or receptacle for the excrementitious deposits. It is placed in the lower part of the box *a*, and can be removed and replaced through the door *f* when necessary. *g* is a hopper or deodorant-receptacle, which is to be filled with the fine dry earth or clay, and which is supplied through a hinged lid, *h*, at the top. *i* is a sliding platform or reciprocatory carriage, which is arranged to slide back and forth immediately beneath the lower open end of the hopper *g*. This sliding platform *i* is provided with cross-bars *m*, which rest and slide on guides or ways *q*, as shown, and it has at *o* a rack, into which mesh the teeth of a spur-gear, *k*, the shaft of which is arranged in one side of the box *a*, and is provided or formed with sides or vertical portions at the rear and two side portions, but at its front is left open, as shown. The hopper *g* may have a hinged flap at its lower front edge to close a long narrow opening made at the said portion of the hopper. The object and operation of this hinged flap will be hereinafter explained more fully. The arrangement or adjustment of the sliding platform or carrier *i* with the lower open end of the hopper *g* and the rack and pinion should be such that, by turning the crank-handle *l* in first one and then the other direction, said carrier *i* will be reciprocated back and forward beneath the hopper, the surface of said carrier running immediately beneath the open end of the hopper in such a manner as to serve as a bottom to the hopper, and also to perform the office of carrying from the hopper at each forward stroke a charge of the powdered earth, to be subsequently emptied onto the excrement deposited in the pan or receptacle *e*.

The operation of my improved earth-closet may be thus explained: Supposing the platform or carrier *i* to be drawn back so that its forward end is about under the front edge of the hopper, the excrementitious matter is deposited in the pan *e*, and, the occupant of the closet turning the handle *l* in a given direction, the carrier or platform *i* is caused, through the medium of the pinion *k* and rack *o*, to move forward. As it moves forward it carries along on its top surface a layer or charge of the powdered earth, (contained in hopper *g*,) which is permitted to flow out at the open lower end of the hopper, and the discharge or escape of the earth onto the said carrier or platform *i* may be facilitated by the tendency of a hinged flap or valve to swing open and outward, and thus permit a more free escape of the earth. The handle *l* is then turned by the occupant in the opposite direction to effect the emptying of the charge of earth from the top surface of the carrier *i* onto the excrement. As the handle is thus turned the pinion *k* (being driven in a direction opposite to that in which it was turned to feed the rack *o* forward) causes the platform *i* to recede or travel back into its former position, and as it moves backward the layer of earth carried forward on its upper surface is scraped off by the front lower portion of the hopper *g*, and falls into the receptacle *e*, covering and deodorizing the excrementitious deposit; and, having the parts in adjustment or position for a re-use of the closet, it will be understood that the moment the carrier or platform *i* begins to recede or travel backward to effect the dumping of the charge of deodorant into the excrement-chamber *e* the tendency of the charge or accumulation of earth on its top surface would be to push and hold backward (or in a closed condition) the flap or valve, and that, the said flap being thus and also by its gravity held back, the earth which had been previously deposited from the hopper onto the top surface of *i*, and by it carried forward, would, during the backward stroke of said carrier *i*, be discharged into the pan *e*.

It will be seen that modifications of construction in the details of the machine may be made without departing from the characteristic feature which distinguishes my invention from earth-closets heretofore known—viz., the use of a reciprocatory carriage or platform arranged to move beneath the lower open end of the hopper, (in about a horizontal plane,) and adapted to perform the functions of a false bottom to the hopper, and a carrier to receive (on its upper surface) and carry forward for future discharge a charge of the deodorant; and it would be understood that, although I have described in connection with this main feature a particular manner of emptying the charge of earth carried forward on said platform, some other means may be adopted to effect the emptying of the charge from the carrier into the excrement-chamber *e*, and the main feature of my invention thus be embraced in a machine not made in all particulars in accordance with the foregoing description.

I am aware that earth-closets have heretofore been made with a case, excrement-chamber, and hopper or earth-receptacle, substantially similar to what I have shown; but in all the apparatuses of which I have any knowledge the earth-distributing mechanism or device has been composed of some sort of rotatory or swinging distributer which received the charge of earth from the hopper and dumped or discharged it into the excrement-chamber, in contradistinction to a reciprocatory platform or plane arranged to move back and forth beneath the lower open end of a hopper, and serve the double purpose of a false bottom to the hopper and a carrier to receive and carry forward, for subsequent discharge into the excrement-chamber, the charge of earth.

Of course the reciprocatory carriage may have its actuating mechanism connected in a suitable way with the hinged lid of the seat or with a depressible seat-piece in lieu of with a hand-crank, *l*, as shown, so as to have the said carriage moved or operated by the lifting and lowering of said lid, or by the sliding upon and rising from the said depressible seat of the occupant.

Having explained my invention so that one skilled in the art can make and use a closet or commode embracing the same, what I claim as new, and desire to secure by Letters Patent, is—

A reciprocatory platform or carrier arranged immediately beneath the lower open end of the earth-hopper, and adapted to be moved backward and forward, substantially in the manner and for the purposes set forth.

In testimony whereof I have hereunto set my hand and seal this 16th day of June, 1871.

GEO. E. WARING, JR. [L. S.]

In presence of—
EDMUND TWEEDY,
C. N. GAVITT.